United States Patent Office 3,346,811
Patented Oct. 10, 1967

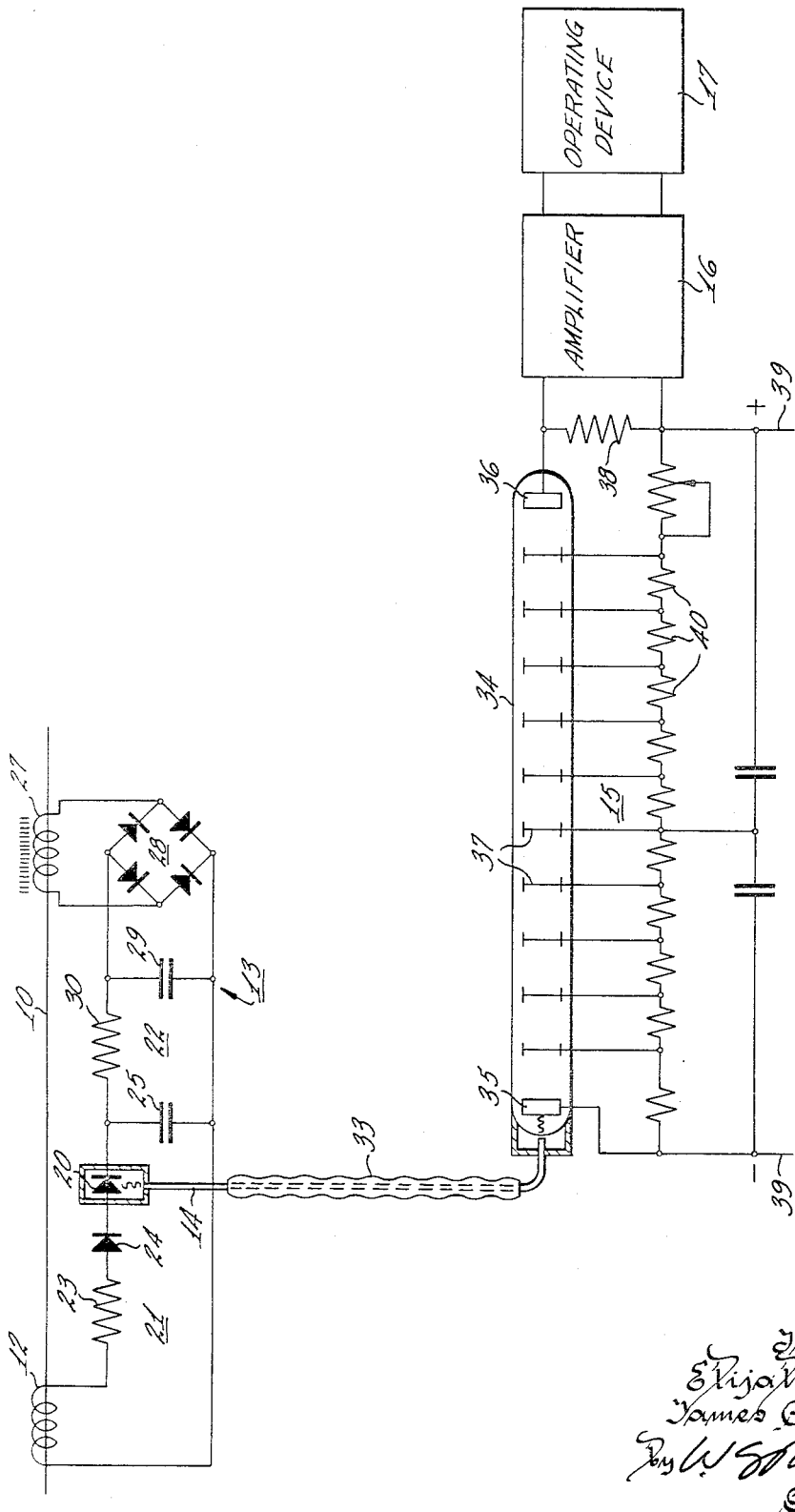

3,346,811
MEANS FOR SENSING CONDITIONS IN HIGH POTENTIAL REGION AND FOR TRANSMITTING SUCH INTELLIGENCE BY LIGHT MEANS TO LOW POTENTIAL REGIONS
Elijah R. Perry and James C. W. Ransom, Portland, Oreg., assignors, by mesne assignments, to Allis-Chalmers Manufacturing Company, Milwaukee, Wis.
Filed Feb. 24, 1964, Ser. No. 346,892
2 Claims. (Cl. 324—96)

ABSTRACT OF THE DISCLOSURE

A current transformer positioned near a high voltage transmission line detects line current conditions. Means associated with the transformer translate intelligence about such conditions into a light signal from a light emitting diode. The light signal is transmitted through a fiber optic dielectric device to light signal receiving means located in a region of ground potential which converts the light signal to a usable electrical signal.

This invention relates generally to electrical measuring apparatus, more specifically to a system for generating a signal corresponding to an electrical measurement made in a region of high potential and transmitting the signal to receiving and operating components located in a region of ground potential.

The invention will be described as it is applied to measure the current in a high voltage system. In a conventional current transformer for a high voltage system, the line conductor is looped through the window of a magnetic core that carries one or more secondary windings. The core and secondary winding are connected to be at ground potential. The line conductor is insulated from ground by solid insulating material formed on the conductors and core of the current transformer, by gas or liquid insulation in the housing of the current transformer, and by a large porcelain bushing that leads the line conductor down to the level of the core and secondary assembly. This conventional current transformer illustrates the problem common to the devices that will be discussed in this description, the information about the conditions of the line must be transmitted through a dielectric that is suitable to electrically insulate the high potential region of the sensing devices from the ground potential region of the receiving devices. Because the bushings for conventional current transformers for high potential electrical systems are very costly, engineers have looked for an accurate and reliable but less expensive device. An object of this invention is to provide a new and improved measuring system that uses a dielectric signaling medium that is less expensive than the porcelain structure of conventional current transformers.

The prior art has suggested locating a microwave or acoustical carrier generator at line potential and modulating its output to transmit a signal representing the line current wave form to receivers located at ground. These devices have been troubled by interference from outside radio and acoustical signals. Another object of this invention is to provide an improved electrical measuring system in which dielectric that transmits the information from sender to receiver excludes interference.

The system of this invention has a sensing and sending unit located at line potential that generates a light signal that varies according to a measured quantity of the high voltage system. A receiving unit is located at ground potential to receive the light signal and to produce a corresponding electrical signal. Preferably, to exclude extraneous light from the receiver, a fiber optic device is connected to transmit light from the sender to the receiver.

The detailed description of the system and its components will suggest problems in achieving a suitable modulated light system and corresponding features and advantages of the system of this invention.

The single figure in the drawing is a schematic of a high voltage electrical system and the electrical measuring system of this invention.

Introduction

The drawing shows the apparatus of this invention as it is adapted to measure the current of a line 10 of a high voltage electrical system. The apparatus includes a sensor 12 for sensing the line current, a sending unit 13 that produces a light signal that is modulated according to the value of line current, a transmission line 14 that transmits the output of sender 13 to a point of ground potential, a receiver 15 connected to the output of the transmission line, and amplifier system 16 that drives an operating device 17. Sensor 12, illustrated as a current transformer, and sender 13 are conductively or capacitively coupled to line 10 to be at high potential above ground. Receiver 15, amplifier system 16, and operating device 17 are located in a region of ground potential or some other potential substantially different from line 10. Transmission line 14 links the sender and the receiver and electrically isolates these elements.

The sender

Sender 13 includes a light source 20 that produces a light that varies in intensity as a function of an electrical input. Preferably, source 20 is a semiconductor device that produces light at a semiconductor junction as it conducts; a suitable light source is a diffused gallium arsenide infrared source, type SNX–110 of Texas Instruments Incorporated. Line 14 is positioned to receive this light. The sender also includes a circuit loop 21 connecting source 20 to receive the current wave form of current transformer 12 and a circuit loop 22 connecting source 20 to receive a substantially magnitude invariant current that biases source 20 to have a quiescent operating point at about midpoint of its current-light characteristic.

Circuit loop 21 includes (in addition to current transformer 12 and light source 20) a resistor 23, a conventional diode 24, and a capacitor 25 that is common to both loops 21, 22. Resistor 23 and capacitor 25 cooperate with elements of loop 22 to establish a selected value of bias current; the schematic drawing of resistor 23 can be considered to represent a discrete resistor plus the other resistances of loop 21 that are not schematically shown. Diode 24 prevents reverse voltages from appearing across light source 20.

Circuit loop 22 includes a current transformer 27 coupled to line 10 to receive electrical power; a rectifier 28 connected to rectify the AC output of transformer 27, and a low pass filter comprising a pi connection of a capacitor 29 and resistor 30 and previously mentioned capacitor 25 that maintains a substantially magnitude invariant voltage across capacitor 25. Preferably current transformer 27 has a saturable core to act as a stable voltage source.

Current transformer 12 is given the appropriate turns ratio to keep the peak to peak value of the largest current to be measured within the rating of light source 20, and the full sinusoid of line current wave form appears in the modulated light signal.

Since diode 24 is forward biased continuously when the line current is within the range intended to be measured, the alternating component of current and the bias component of current of loop 21 can be analyzed by superposition. Current transformer 12 can be considered to be a current source as to the alternating current; that is, its current depends only on the line current and the turns ratio and is independent of the electrical values of the circuit connected across its terminals (except as they increase the magnetizing component of line current). Capacitor 25 is made large enough to be substantially a short circuit to the operating frequency and transients of line 10. Loop 22 maintains a substantially invariant voltage across capacitor 25; resistance 23 transforms this voltage into a substantially fixed current in loop 21 (current transformer 12 acts as a short circuit to this current).

Thus, sender 13 produces a light signal that accurately describes the line current except that where the line current crosses zero the light signal crosses the quiescent value.

The transmission line

The transmission line is made long enough to have the appropriate dielectric strength for the voltage of line 10 and to reach a convenient location for the receiving components. Preferably, line 14 is enclosed in a porcelain sealed tube 33 to prevent moisture from forming a conductive layer along its surface.

The receiver

The receiver is illustrated as comprising a photo multiplier tube 34 having a light receiving electron emitting electrode 35, an electron receiving electrode 36, and intermediate accelerating electrodes 37. Electrodes 35, 36, 37 are maintained at appropriate polarities by a power supply 39 and an array of voltage dividing resistors 40.

Fiber optic transmission line 14 is positioned to transmit light from light source 20 to electrode 35 of tube 34. By a process of accelerating electrons that electrode 35 emits in response to light, tube 34 produces current at electrode 36 that corresponds to the light emitted by source 20 and to the corresponding current in sender 13 and line 10. A resistor 38 is connected to conduct in series with electrode 36 to produce an output voltage corresponding to this current.

The amplifier system

A system 16 of suitable amplifiers is connected to receive the output of tube 34 and produce a power signal for driving indicating device 17 or other operating devices such as relays. Preferably the amplifiers of system 16 are AC coupled so that they transmit the AC component of the output of receiver 15 but reject the DC component. Thus in the output of system 16 the zero crossings of line 10 are restored.

Those skilled in the are will recognize the application of this invention to various sensing devices and operating devices and various appropriate modifications of the sender, transmission line, receiver, and the amplifying system that have been described specifically.

Having now particularly described and ascertained the nature of our said invention and the manner in which it is to be performed, we declare that what we claim is:

1. A device for sensing an electrical condition in a high voltage electrical power transmission system which is surrounded by a region of high potential comprising,
    a light source comprising a semiconductor located in said region of high potential and responsive to current to produce a light signal at a junction,
    a pair of current transformers located in said region of high potential and each inductively coupled to said system,
    one of said current transformers providing bias current energization for said semiconductor which causes the latter to emit a quiescent light value,
    the other of said current transformers providing a current output which varies as the transmission system condition varies, said current output energizing said semiconductor to cause its light emission signal to vary about said quiescent value,
    light responsive means positioned in a region outside of said high potential region and operable in response to a light signal from said semiconductor to produce an electrical output signal in response to the value of said light signal,
    flexible dielectric fiber optic light transmitting means extending between said semiconductor and said light receiving means to transmit the light signal from said light source to said light responsive means,
    and means responsive to said electrical output signal to transmit the light signal from said light source to said light responsive means.

2. A device according to claim 1 wherein said means responsive to said output electrical signal is an indicating device.

References Cited
UNITED STATES PATENTS

| | | | |
|---|---|---|---|
| 1,751,584 | 3/1930 | Hansell | 350—96 X |
| 2,038,277 | 4/1936 | Gent | 324—96 |
| 2,081,839 | 5/1937 | Rankin | 324—96 |
| 2,302,874 | 11/1942 | Lion | 324—96 |
| 2,389,649 | 11/1945 | Stark | 250—84 X |
| 2,724,821 | 11/1955 | Schweitzer | 324—96 |
| 3,043,958 | 7/1962 | Diemer | 250—211 |
| 3,068,739 | 12/1962 | Hicks et al. | 350—96 |
| 3,120,125 | 2/1964 | Vasel | 350—96 X |

OTHER REFERENCES

Ritchey, N. B., "Self-Contained U.H.F. Wattmeter," pp. 10, 11, 22, and 23 of "Engineering Department" (Advanced Dev. Labs., Sylvania Elec. Prod.) December 1946.

RUDOLPH V. ROLINEC, *Primary Examiner.*

WALTER L. CARLSON, *Examiner.*

UNITED STATES PATENT OFFICE

CERTIFICATE OF CORRECTION

Patent No. 3,346,811                                October 10, 1967

Elijah R. Perry et al.

It is hereby certified that error appears in the above numbered patent requiring correction and that the said Letters Patent should read as corrected below.

Column 4, lines 31 and 32, strike out "to transmit the light signal from said light source to said light responsive means".

Signed and sealed this 26th day of November 1968.

(SEAL)
Attest:

Edward M. Fletcher, Jr.                                    EDWARD J. BRENNER
Attesting Officer                                                Commissioner of Patents